(12) United States Patent
Vedha

(10) Patent No.: US 10,222,935 B2
(45) Date of Patent: Mar. 5, 2019

(54) TREEMAP-TYPE USER INTERFACE

(71) Applicant: Cisco Technology Inc., San Jose, CA (US)

(72) Inventor: Praveen Vedha, Tamilnadu (IN)

(73) Assignee: CISCO TECHNOLOGY INC., San Jose, CA (US)

( * ) Notice: Subject to any disclaimer, the term of this patent is extended or adjusted under 35 U.S.C. 154(b) by 542 days.

(21) Appl. No.: 14/317,296

(22) Filed: Jun. 27, 2014

(65) Prior Publication Data

US 2015/0309671 A1 Oct. 29, 2015

(30) Foreign Application Priority Data

Apr. 23, 2014 (IN) .......................... 1112/DEL/2014

(51) Int. Cl.
*G06F 3/0482* (2013.01)
*G06F 17/30* (2006.01)
*G06F 3/0484* (2013.01)

(52) U.S. Cl.
CPC ........ *G06F 3/0482* (2013.01); *G06F 3/04842* (2013.01); *G06F 17/3053* (2013.01)

(58) Field of Classification Search
CPC ...... G06F 3/0482; G06F 3/00; G06F 3/04842; G06F 17/3053
See application file for complete search history.

(56) References Cited

U.S. PATENT DOCUMENTS

| | | |
|---|---|---|
| 6,330,231 B1 | 12/2001 | Bi |
| 6,415,164 B1 | 7/2002 | Blanchard et al. |
| 6,453,345 B2 | 9/2002 | Trcka et al. |
| 6,470,383 B1 | 10/2002 | Leshem et al. |

(Continued)

FOREIGN PATENT DOCUMENTS

| | | |
|---|---|---|
| GB | 2 389 017 A | 11/2003 |
| JP | 2011-204656 | 10/2011 |

OTHER PUBLICATIONS

Josh Constine, "Facebook's Relevance-Filtered Chat buddy List, or, Why Users Don't Know Who's Online," available at http//www/insidefacebook.com/2011/08/08/relevance-filtered-chat-buddy-list-or-why-users-don't-know-who's-online (Aug. 8, 2011).

(Continued)

*Primary Examiner* — Kevin L Young
*Assistant Examiner* — Parmanand D Patel
(74) *Attorney, Agent, or Firm* — Polsinelli PC

(57) ABSTRACT

In one embodiment, a user interface system based on a treemap-type presentation includes a processor and a memory. The processor is operative to store data for items which can be invoked, generate data for a user interface screen having regions arranged according to an arrangement, at least some of the regions being different sizes and being arranged according to size order, assign at least some of the items to the regions, receive user selections from an input device, determine which item is being selected for each user selection, refresh an assignment of the items among the regions of the user interface screen so that even though the assignment of the items among the regions is changed as a result of the refreshment, the arrangement and sizes of the regions in the user interface screen remain unchanged. Related apparatus and methods are also described.

18 Claims, 11 Drawing Sheets

(56) References Cited

U.S. PATENT DOCUMENTS

| | | | |
|---|---|---|---|
| 7,027,052 B1* | 4/2006 | Thorn | G06T 11/206 345/440 |
| 7,036,087 B1* | 4/2006 | Odom | G06F 3/04817 715/779 |
| 7,043,702 B2 | 5/2006 | Chi et al. | |
| 7,051,029 B1 | 5/2006 | Fayyad et al. | |
| 7,603,373 B2 | 10/2009 | Error et al. | |
| 7,644,365 B2 | 1/2010 | Bhattacharya et al. | |
| 7,730,223 B1 | 6/2010 | Bavor et al. | |
| 7,792,844 B2 | 9/2010 | Error et al. | |
| 7,921,459 B2 | 4/2011 | Houston et al. | |
| 7,945,620 B2 | 5/2011 | Bou-Ghannam et al. | |
| 7,958,189 B2 | 6/2011 | Bernstein | |
| 8,006,198 B2 | 8/2011 | Okuma et al. | |
| 8,037,421 B2 | 10/2011 | Scott et al. | |
| 8,245,297 B2 | 8/2012 | Lim | |
| 8,325,626 B2 | 12/2012 | Tóth et al. | |
| 8,380,359 B2 | 2/2013 | Duchene et al. | |
| 8,423,163 B2 | 4/2013 | Park | |
| 8,429,562 B2 | 4/2013 | Gourdol et al. | |
| 8,442,693 B2 | 5/2013 | Mirza et al. | |
| 8,443,289 B2 | 5/2013 | Sahashi et al. | |
| 8,448,076 B2 | 5/2013 | Hammack et al. | |
| 8,619,958 B2 | 12/2013 | Patisaul et al. | |
| 8,650,492 B1 | 2/2014 | Mui et al. | |
| 8,738,158 B2 | 5/2014 | Sims et al. | |
| 8,762,475 B2 | 6/2014 | Cheung et al. | |
| 8,839,404 B2 | 9/2014 | Li et al. | |
| 8,868,736 B2 | 10/2014 | Bowler et al. | |
| 8,958,318 B1 | 2/2015 | Hastwell et al. | |
| 8,977,794 B2 | 3/2015 | Grohman et al. | |
| 8,994,539 B2 | 3/2015 | Grohman et al. | |
| 9,112,719 B2 | 8/2015 | Sasaki et al. | |
| 9,185,002 B2 | 11/2015 | Sasaki et al. | |
| 9,317,778 B2 | 4/2016 | Cordova-Diba et al. | |
| 9,318,016 B2 | 4/2016 | Park | |
| 9,354,798 B2 | 5/2016 | Sasaki et al. | |
| 9,462,041 B1 | 10/2016 | Hagins et al. | |
| 9,516,374 B2 | 12/2016 | Cormican et al. | |
| 9,584,853 B2 | 2/2017 | Frebourg et al. | |
| 9,686,581 B2 | 6/2017 | Cormican et al. | |
| 9,733,983 B2 | 8/2017 | Kukreja et al. | |
| 9,900,224 B2 | 2/2018 | Dumitriu et al. | |
| 9,985,837 B2 | 5/2018 | Rao et al. | |
| 2001/0048373 A1 | 12/2001 | Sandelman | |
| 2002/0049749 A1 | 4/2002 | Helgeson et al. | |
| 2002/0087976 A1 | 7/2002 | Kaplan et al. | |
| 2003/0035075 A1 | 2/2003 | Butler et al. | |
| 2003/0229529 A1 | 12/2003 | Mui et al. | |
| 2004/0010561 A1 | 1/2004 | Kim et al. | |
| 2004/0041833 A1 | 3/2004 | Dikhit | |
| 2004/0236774 A1 | 11/2004 | Baird et al. | |
| 2005/0146534 A1 | 7/2005 | Fong et al. | |
| 2006/0005228 A1 | 1/2006 | Matsuda | |
| 2006/0129939 A1 | 6/2006 | Nelles et al. | |
| 2007/0037563 A1 | 2/2007 | Yang et al. | |
| 2007/0061486 A1 | 3/2007 | Trinh et al. | |
| 2007/0226325 A1 | 9/2007 | Bawa et al. | |
| 2007/0239854 A1 | 10/2007 | Janakiraman et al. | |
| 2008/0045142 A1 | 2/2008 | Kim | |
| 2008/0084888 A1 | 4/2008 | Yadav et al. | |
| 2008/0101381 A1 | 5/2008 | Sun et al. | |
| 2008/0126930 A1 | 5/2008 | Scott | |
| 2008/0127057 A1 | 5/2008 | Costa et al. | |
| 2008/0163207 A1 | 7/2008 | Reumann et al. | |
| 2008/0307451 A1 | 12/2008 | Green | |
| 2009/0153288 A1 | 6/2009 | Hope et al. | |
| 2009/0307485 A1 | 12/2009 | Weniger et al. | |
| 2010/0023865 A1 | 1/2010 | Fulker et al. | |
| 2010/0031202 A1 | 2/2010 | Morris et al. | |
| 2010/0033422 A1 | 2/2010 | Mucignat et al. | |
| 2010/0169755 A1 | 7/2010 | Zafar et al. | |
| 2010/0174583 A1 | 7/2010 | Passova et al. | |
| 2010/0188328 A1 | 7/2010 | Dodge et al. | |
| 2010/0218211 A1 | 8/2010 | Herigstad et al. | |
| 2010/0262477 A1 | 10/2010 | Hillerbrand et al. | |
| 2010/0275139 A1 | 10/2010 | Hammack et al. | |
| 2010/0280637 A1 | 11/2010 | Cohn et al. | |
| 2011/0030013 A1 | 2/2011 | Diaz Perez | |
| 2011/0050594 A1 | 3/2011 | Kim et al. | |
| 2011/0115741 A1 | 5/2011 | Lukas et al. | |
| 2011/0142053 A1 | 6/2011 | Van Der Merwe et al. | |
| 2011/0182295 A1 | 7/2011 | Singh et al. | |
| 2011/0185303 A1 | 7/2011 | Katagi et al. | |
| 2011/0191303 A1 | 8/2011 | Kaufman et al. | |
| 2011/0193788 A1 | 8/2011 | King et al. | |
| 2011/0202270 A1 | 8/2011 | Sharma et al. | |
| 2011/0208541 A1 | 8/2011 | Wilson et al. | |
| 2011/0209089 A1 | 8/2011 | Hinckley et al. | |
| 2011/0209104 A1 | 8/2011 | Hinckley et al. | |
| 2011/0221777 A1 | 9/2011 | Ke | |
| 2011/0239142 A1 | 9/2011 | Steeves et al. | |
| 2012/0005609 A1 | 1/2012 | Ata et al. | |
| 2012/0054367 A1 | 3/2012 | Ramakrishnan et al. | |
| 2012/0140255 A1* | 6/2012 | Tanaka | G06F 9/445 358/1.13 |
| 2012/0154138 A1 | 6/2012 | Cohn et al. | |
| 2012/0154294 A1 | 6/2012 | Hinckley et al. | |
| 2012/0185791 A1 | 7/2012 | Claussen et al. | |
| 2012/0192111 A1 | 7/2012 | Hsu et al. | |
| 2012/0210349 A1 | 8/2012 | Campana et al. | |
| 2012/0235921 A1 | 9/2012 | Laubach | |
| 2012/0290940 A1 | 11/2012 | Quine | |
| 2012/0291068 A1 | 11/2012 | Khushoo et al. | |
| 2012/0324035 A1 | 12/2012 | Cantu et al. | |
| 2013/0021281 A1 | 1/2013 | Tse et al. | |
| 2013/0024799 A1 | 1/2013 | Fadell et al. | |
| 2013/0047125 A1 | 2/2013 | Kangas et al. | |
| 2013/0069969 A1 | 3/2013 | Chang et al. | |
| 2013/0124523 A1 | 5/2013 | Rogers et al. | |
| 2013/0145008 A1 | 6/2013 | Kannan et al. | |
| 2013/0145307 A1 | 6/2013 | Kawasaki | |
| 2013/0152017 A1 | 6/2013 | Song et al. | |
| 2013/0155906 A1 | 6/2013 | Nachum et al. | |
| 2013/0159898 A1 | 6/2013 | Knospe et al. | |
| 2013/0174191 A1 | 7/2013 | Thompson, Jr. et al. | |
| 2013/0179842 A1 | 7/2013 | Deleris et al. | |
| 2013/0201215 A1 | 8/2013 | Martellaro et al. | |
| 2013/0218987 A1 | 8/2013 | Chudge et al. | |
| 2013/0265905 A1 | 10/2013 | Filsfils | |
| 2013/0322438 A1 | 12/2013 | Gospodarek et al. | |
| 2013/0322848 A1 | 12/2013 | Li | |
| 2013/0326583 A1 | 12/2013 | Freihold et al. | |
| 2013/0347018 A1 | 12/2013 | Limp et al. | |
| 2014/0002580 A1 | 1/2014 | Bear et al. | |
| 2014/0007089 A1 | 1/2014 | Bosch et al. | |
| 2014/0013271 A1* | 1/2014 | Moore | G06F 3/0482 715/792 |
| 2014/0016926 A1 | 1/2014 | Soto et al. | |
| 2014/0025770 A1 | 1/2014 | Warfield et al. | |
| 2014/0033040 A1 | 1/2014 | Thomas et al. | |
| 2014/0040784 A1 | 2/2014 | Behforooz et al. | |
| 2014/0089992 A1 | 3/2014 | Varoglu et al. | |
| 2014/0105213 A1 | 4/2014 | A K et al. | |
| 2014/0108614 A1 | 4/2014 | Gunderson et al. | |
| 2014/0108985 A1 | 4/2014 | Scott et al. | |
| 2014/0130035 A1 | 5/2014 | Desai et al. | |
| 2014/0132594 A1 | 5/2014 | Gharpure et al. | |
| 2014/0176479 A1 | 6/2014 | Wardenaar | |
| 2014/0198808 A1 | 7/2014 | Zhou | |
| 2014/0201681 A1* | 7/2014 | Mahaffey | H04M 1/72569 715/846 |
| 2014/0269321 A1 | 9/2014 | Kamble et al. | |
| 2014/0280133 A1 | 9/2014 | Dulitz | |
| 2014/0281012 A1 | 9/2014 | Troxler et al. | |
| 2014/0282213 A1 | 9/2014 | Musa et al. | |
| 2014/0298210 A1 | 10/2014 | Park et al. | |
| 2014/0310623 A1 | 10/2014 | O'Connell, Jr. et al. | |
| 2014/0320387 A1 | 10/2014 | Eriksson et al. | |
| 2014/0337824 A1 | 11/2014 | St. John et al. | |
| 2014/0373064 A1 | 12/2014 | Ray | |
| 2015/0006296 A1 | 1/2015 | Gupta et al. | |
| 2015/0012881 A1 | 1/2015 | Song et al. | |
| 2015/0019991 A1 | 1/2015 | Kristjansson | |

(56) References Cited

U.S. PATENT DOCUMENTS

| | | |
|---|---|---|
| 2015/0030024 A1 | 1/2015 | Venkataswami et al. |
| 2015/0043581 A1 | 2/2015 | Devireddy et al. |
| 2015/0058314 A1 | 2/2015 | Leclerc et al. |
| 2015/0074735 A1 | 3/2015 | Herigstad et al. |
| 2015/0081701 A1 | 3/2015 | Lerios et al. |
| 2015/0128046 A1 | 5/2015 | Cormican et al. |
| 2015/0128050 A1 | 5/2015 | Cormican et al. |
| 2015/0163192 A1 | 6/2015 | Jain et al. |
| 2015/0169208 A1 | 6/2015 | Cho |
| 2015/0193549 A1 | 7/2015 | Frye et al. |
| 2016/0034051 A1 | 2/2016 | Xi et al. |
| 2016/0063954 A1 | 3/2016 | Ryu |
| 2016/0154575 A1 | 6/2016 | Xie et al. |
| 2016/0253046 A1 | 9/2016 | Garrison et al. |
| 2016/0364085 A1 | 12/2016 | Henderson et al. |
| 2018/0143868 A1 | 5/2018 | Johnston et al. |

OTHER PUBLICATIONS

Toby Yu, "Resizable Contacts Widget Pro" (Oct. 7, 2013).
"Sorting Your Chat List," available at https://support.google.com/chat/answer/161035?hl=en (Google 2014).
"User Interface-Changing Icon Appearance Based on Frequency of Use (Samsung)—Patent Application—Prior Art Request" available at http://patents.stackexchange.com/questions/4233/user-interface-changing-icon-appearance-based-on—(Jul. 26, 2013).
"Using The Tile View" (Visokio 2013).
"AppRF," arubanetworks.com, retrieved Nov. 7, 2017, 12 pages.
"Attractive-jQuery-Circular-Countdown-Timer-Plugin-TimeCircles," Jan. 19, 2015, 1 page.
Christian, Josh, "Four Images on One Screen!—Make Your Home Theater More Versatile," DSI Entertainment Systems, Inc., Sep. 2, 2010, 2 pages.
"Definition of *together*," Merriam-Webster, 2 pages.
DSI Entertainment Systems, "Creston control of a high-end custom home theater design in Los Angeles," youtube.com, Uploaded on Dec. 14, 2010.
Firewall Builder, http://www.fwbuilder.ord/4.0/screenshots.shtml retrieved Nov. 7, 2017, 4 pages.
"Flow diagram," http://en.wikipedia.org/wiki/Flow_diagram, retrieved on Jun. 11, 2015, 2 pages.
Galitz, Wilbert O., "The Essential Guide to User Interface Design," second edition, 2002, p. 477-478.
"GitHub," https://github.com/tejas-rane/CLI-forRYU-Firewall retrieved Nov. 9, 2017.
"Google Gesture Search," Goggle, Jun. 21, 2013.
"Introducing the new Sky+ app for iPad," Sky.com, 2 pages.
McNamara, Katherine, "Firepower Setup and Policy Creation," Aug. 12, 2016, 2 pages.
Mui, Phil, "Introducing Flow Visualization: visualizing visitor flow," Google Analytics Blog, Oct. 19, 2011, 6 pages.
Neeman, Patrick, "Goggle Is Missing Social and Their Culture May Be to Blame," Jun. 12, 2013, 9 pages.
Pozo, S., et al., "AFPL2, An Abstract Language for Firewall ACLs with NAT support," Jun. 2009, 8 pages.
Residential Systems, Inc "ISE 2014: Savant Systems Displays SmartView Video Tiling Interface," youtube.com, published Feb. 6, 2014.
Residential Systems, Inc., "Savant Video Tiling from Residential Systems, Inc.," youtube.com, posted Dec. 26, 2013.
"SmartView Tiling User Guide," Savant Systems LLC, Jan. 2014, pp. 1-25.
"Suggestion: Browser "new tab"—cover gesture to include bookmarks," Feb. 11, 2014.
The Lync Insider, "The "Inside" Perspective on Skype for Business Server 2015, Lync Server 2012, VOIP and UNIFIE . . . " Jun. 8, 2015, 23 pages.
"Tweetbot for MAC," http://tapbots.com/tweetbot/mac/ retrieved Jun. 8, 2015, 3 pages.
Wagner, Kyle, "The OS X Lion Survival Guide," Jul. 21, 2011, 7 pages.
Wkipedia, "Sankey Diagram," Jun. 11, 2015, 2 pages.
"Y! Multi messenger 2.0.0.100," last update Sep. 10, 2013, http://y-multi-messeger.soft32.com.
"zeebox is your TV sidekick," Zeebox.com, 2012.

\* cited by examiner

US 10,222,935 B2

TREEMAP-TYPE USER INTERFACE

TECHNICAL FIELD

The present disclosure relates to user interfaces, and in particular, but not exclusively to, a user interface based on a treemap-type data presentation.

BACKGROUND

Many operating systems and applications, for example, but not limited to, mobile phone systems, personal computer systems, electronic program guide systems, provide tile or icon based user interfaces or list interfaces to access the frequently used contacts and/or applications and/or media items. The interfaces typically lack customization and do not handle the most frequently used items in an effective way.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present invention, a user interface system based on a treemap-type presentation, the system including a processor; and a memory to store data used by the processor, wherein the processor is operative to store data for a plurality of items which can be invoked, generate data for a user interface screen having a plurality of regions arranged according to an arrangement, at least some of the regions being different sizes and being arranged in the arrangement according to size order of the regions, assign at least some of the items to the regions of the user interface screen, receive a plurality of user selections from an input device, determine which one of the items is being selected for each one of the user selections, refresh an assignment of the items among the regions of the user interface screen so that even though the assignment of the items among the regions is changed as a result of the refreshment, the arrangement and sizes of the regions in the user interface screen remain unchanged.

Description Continued

Figure 1:
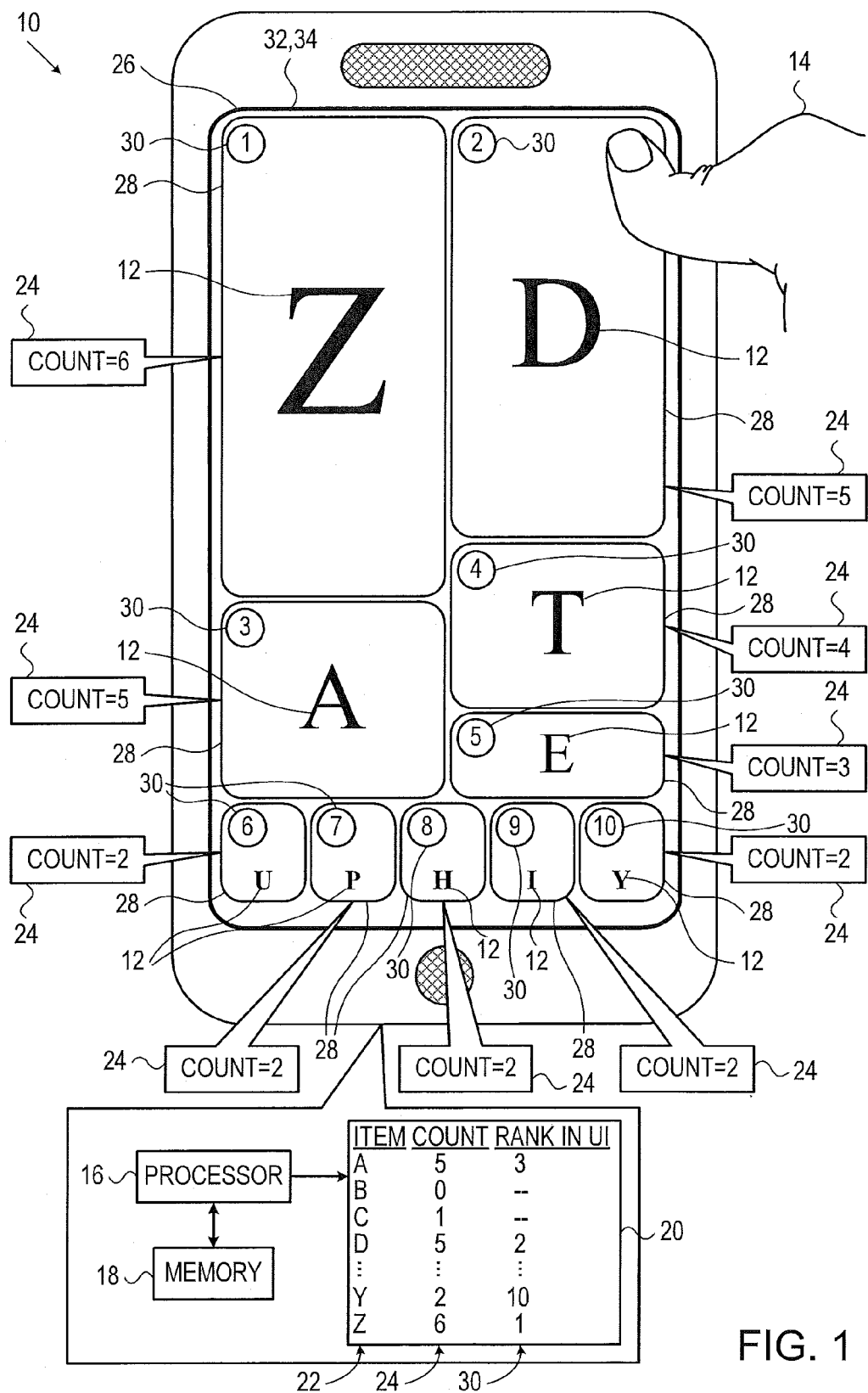
FIG. 1 is a partly pictorial, partly block diagram view of a treemap-type user interface system constructed and operative in accordance with an embodiment of the present invention showing a user invoking an item.

Reference is now made to FIG. 1, which is a partly pictorial, partly block diagram view of a treemap-type user interface system 10 constructed and operative in accordance with an embodiment of the present invention showing a user 14 invoking an item (represented by an icon 12).

The system 10 is based on a treemap-type presentation. Treemaps are typically used in the field of data presentation to display hierarchical (tree-structured) data as a set of nested rectangles. Each branch of the tree is given a rectangle, which is then tiled with smaller rectangles representing sub-branches. A leaf node's rectangle has an area proportional to a specified dimension on the data. Often the leaf nodes are colored to show a separate dimension of the data. The system 10 may diverge from a standard treemap presentation in one or more ways. For example, the system 10 may or may not include nested rectangles.

The system 10 typically includes a processor 16 and a memory 18. The memory 18 is typically used to store data used by the processor 16.

The processor 16 is typically operative to store data for a plurality of items 22 which can be invoked by the user 14. The processor 16 is typically operative to generate a count 24 of how many times each of the items 22 has been invoked by the user 14. The data of the items 22 and the count 24 are typically maintained in a table 20 by the processor 16.

The type of items 22 which can be invoked by the user 14 may be any suitable item type, for example, but not limited to, contacts from an address book, software applications, items in an electronic program guide (EPG), floors selectable from an elevator control panel and Internet sites.

The processor 16 is operative to generate data for a user interface screen 26 (hereinafter referred to as the user interface 26) having a plurality of regions 28 arranged according to a particular arrangement. At least some of the regions 28 are different sizes. The arrangement of the regions 28 is generally a treemap-type arrangement where the regions 28 are substantially rectangular regions arranged according to size order of the regions 28. The term "substantially rectangular" as used in the specification and claims is defined to include any rectangular shape, even one with rounded corners. It will be appreciated by those ordinarily skilled in the art that the shape of the regions 28 may be any suitable shape, for example, but not limited to, an oval, elliptical, circular and square.

The processor 16 is typically operative to assign at least some of the items 22 to the regions 28 of the user interface 26 based on the count 24 of each of the (at least some) items 22 such that each of the regions 28 is assigned to one of the (at least some) items 22. So for example, more frequently invoked items 22 will be assigned to larger regions 28 and provide more prominent access for user 14. Assigning/reassigning the items 22 to the regions 28 is described in more detail with reference to FIGS. 2-11.

Each of the regions 28 is assigned a rank (reference numeral 30) by the processor 16. The regions 28 are ranked by the processor 16 based on size of the regions 28 with a largest one of the regions 28 having the highest rank (rank 1 in FIG. 1) and a smallest one of the regions 28 having the smallest rank (rank 10 in FIG. 1). It will be appreciated that some regions 28, especially the smaller ones, may have different ranks (reference numeral 30) but may be the same size.

Each item 22 in the user interface 26 is ranked by the processor 16 according to the rank (reference numeral 30) of the region 28 assigned to each item 22. The table 20 also includes a column for the rank (reference numeral 30) of each of the items 22 in the user interface 26.

Upon initial set up of the system 10, the processor 16 is typically operative to determine a minimum and maximum size and quantity of the regions 28 based on an operational environment in which the user interface 26 is operating in, such that all the items 22 are accessible with ease in the target operational environment.

For example, in an operational environment where the items 22 are invoked via a touch sensitive display screen, the minimum size of the regions 28 is determined by the size of a finger or stylus. In an operational environment where the items 22 are invoked by voice activation, the minimum size of the regions 28 may be determined by what is considered big enough in order to comfortably see the icons 12 of the items 22 in the user interface 26.

By way of example only, the processor 16 may be operative to calculate the number of regions 28 that can be placed in the accessible display area of the target operational environment as follows. First, the maximum possible number of regions 28 is determined by dividing the total display area by the minimum area of one of the regions 28. Then, the actual number of regions 28 is typically determined to be less than a certain fraction (for example, but not limited to, a half or one-third) of the maximum possible number of regions 28 so that it is possible to have some of the regions 28 with a bigger area for higher ranked items 22. The size of half of the actual number of regions 28 may be set to the minimum size of the regions 28. The remaining half of the actual number of regions 28 may be set to varying sizes in a way that higher ranked item 22 may be assigned larger area regions 28.

Alternatively, the maximum number of items 22 in the user interface 26 may be reduced by the user 14 to be below the maximum number of items 22 determined by the processor 16.

It will be appreciated that the initial set up of the user interface 26 will typically depend on the type of device that the user interface 26 is running on as well as the operational environment that the user interface 26 is running in. For example for a tablet device, the implementer may provide options for the user 14 to customize the number, size and positioning of the regions 28. In a mobile phone device, the implementer may provide options for the user 14 to set the minimum size of the regions 28.

After initial set up, the size and position of each of the regions 28 in the user interface 26 is typically fixed until the user interface 26 is reconfigured by the user 14 or by the system 10, for example, if the display size changes or the user input method changes or the user rotates the display device 32 leading to the processor 16 generating a new arrangement for the user interface 26 in accordance with the new orientation of the display device 32.

Upon set-up of the system 10, the initial assignment of the items 22 to the regions 28 may be performed in any suitable way, for example, but not limited to, alphabetical order, reverse chronological order, rank wise if the usage count 24 for the items 22 is already available in the target operational environment.

The user 14 and/or the system 10 may add or delete items 22 from the table 20 as appropriate. For example, the user 14 may add or delete contacts from an address book which then affects the table 20 of items 22. By way of another example, the system may add and remove applications from the table 20 of items 22 when applications are installed and uninstalled, respectively.

The processor 16 is operative to display the user interface on a suitable display device 32. The display device 32 may be integral with, or separate from, the device which houses the processor 16 and the memory 18.

The processor 16 is typically operative to receive a plurality of user selections from an input device 34. The input device 34 may include any suitable input device, for example, but not limited to, a touch sensitive screen, a pointing device such as a mouse of stylus and/or a voice activated interface.

FIG. 1 shows the user 14 invoking item D of the items 22.

For each user selection, the processor 16 is operative to: determine which one of the regions 28 of the user interface 26 is being selected by that user selection; and determine which one of the items 22 in the user interface 26 is being selected by that user selection based on which item 22 has been assigned to that selected region 28.

Items 22 which are not included (at the present time) in the user interface 26 may be selected by another user interface described in more detail with reference to FIG. 6. In such a case, the processor 16 is operative to determine which item 22 is being selected in the other user interface by the user selection.

The processor 16 is typically operative to execute a program for the selected item 22, for example, dialing a telephone for a selected contact, running a selected application or opening a web browser to a selected website.

The processor 16 is operative to increase the count 24 of the selected item 22 in the table 20 of the items 22.

The processor 16 is typically operative to refresh the arrangement of the user interface 26 when necessary. Update of the user interface 26 is described in more detail with reference to FIGS. 2-11. It should be noted that the user interface 26 is not typically updated every time the count 24 of one item 22 exceeds another item 22. The processor 16 typically updates the user interface 26 when the count 24 of one item 22 exceeds the count 24 of another item 22 by a certain value ("the step") which is greater than 1. Therefore, if the user 14 invokes two items 22 which are separated by a count of 1 in alternate manner, the positions of the two items 22 in the user interface 26 will typically not toggle.

The user interface 26 may include other options for the user 14 to: delete/ignore an item 22 to prevent that item 22 being displayed in the user interface 26; set the size of the step; set the duration of monitoring or tracking in the table 20; assign different colors or pictures to the icons 12 of the items 22; assign text to the icons 12 of the items 22; reset the count 24 in the table 20 of the items 22; limit the number of items 22 in the user interface 26 or specify that the number items 22 in the user interface 26 is limited by the size of the display device 32.

The icons 12 have been depicted as text based icons in FIG. 1. It will be appreciated by those ordinarily skilled in the art that the icon 12 may alternatively, or additionally include graphical representations.

The system 10 may be implemented as a software application or as part of an operating system, for example, but not limited to, in a Smart Phone Operating System to provide a prominent and customizable interface for frequently used items 22.

Figure 2:
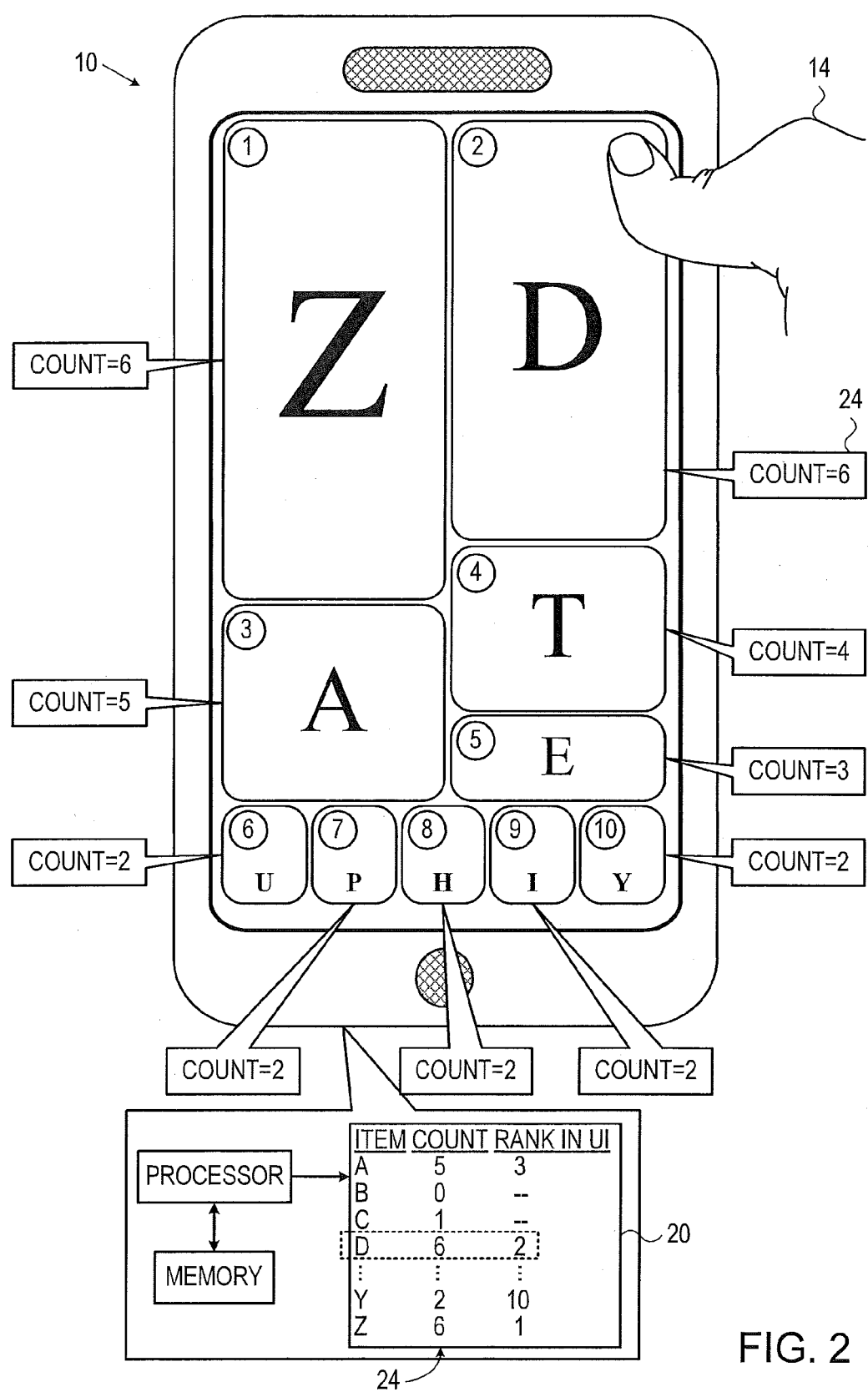
FIG. 2 is a partly pictorial, partly block diagram view of the treemap-type user interface system of FIG. 1 showing the user invoking the item a second time.

Reference is now made to FIG. 2. The count 24 of item D in the table 20 has been updated to 6 based on the user 14 invoking item D as shown in FIG. 1. FIG. 2 shows the user 14 invoking item D a second time.

Figure 3:
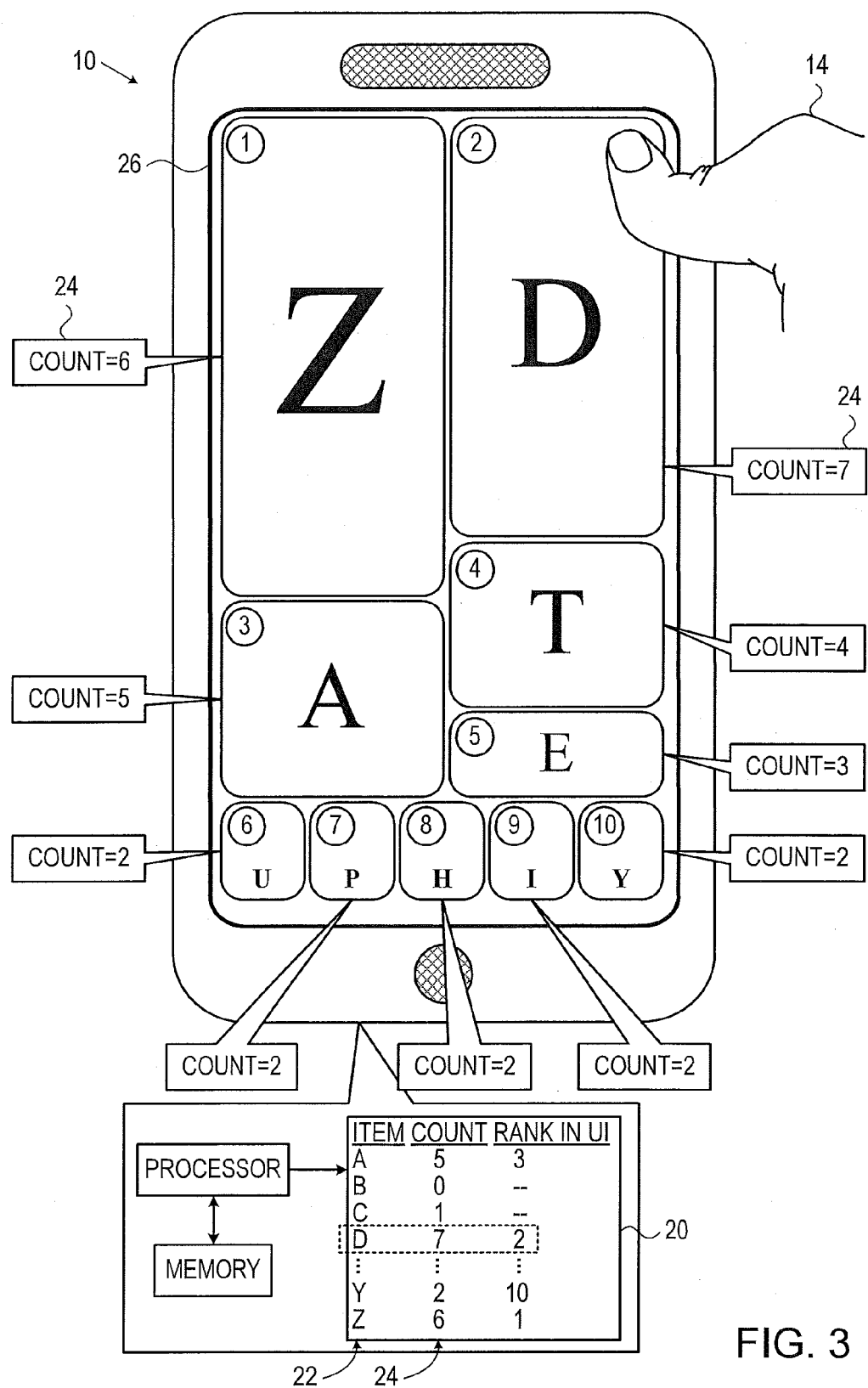
FIG. 3 is a partly pictorial, partly block diagram view of the treemap-type user interface system of FIG. 1 showing the user invoking the item a third time.

Reference is now made to FIG. 3. The count 24 of item D in the table 20 has been updated to 7 based on the user 14 invoking item D as shown in FIG. 2.

Even though, the count 24 of item D (now at 7) exceeds the count 24 of item Z (now at 6) by 1, item D and Z do not swap positions in the user interface 26 as the count of item D does not exceed the count of item Z by the step value which in this example has been set to 3. The step may be any suitable value greater than 1, for example, 2, 3, 4 or even higher. The value of the step may be a function of the rate of selection so that on average the highest ranking items 22 do not toggle more frequently than a certain time value, for example, but not limited to, once a hour, once a day, once a week. For example, in applications where items 22 are invoked very frequently, the step could as high as the user 14 desires or as set by the system 10. For example, the system 10 could set the step to be a function of how many times items are invoked per minute or per hour etc.

FIG. 3 shows the user 14 invoking item D a third time.

Figure 4:
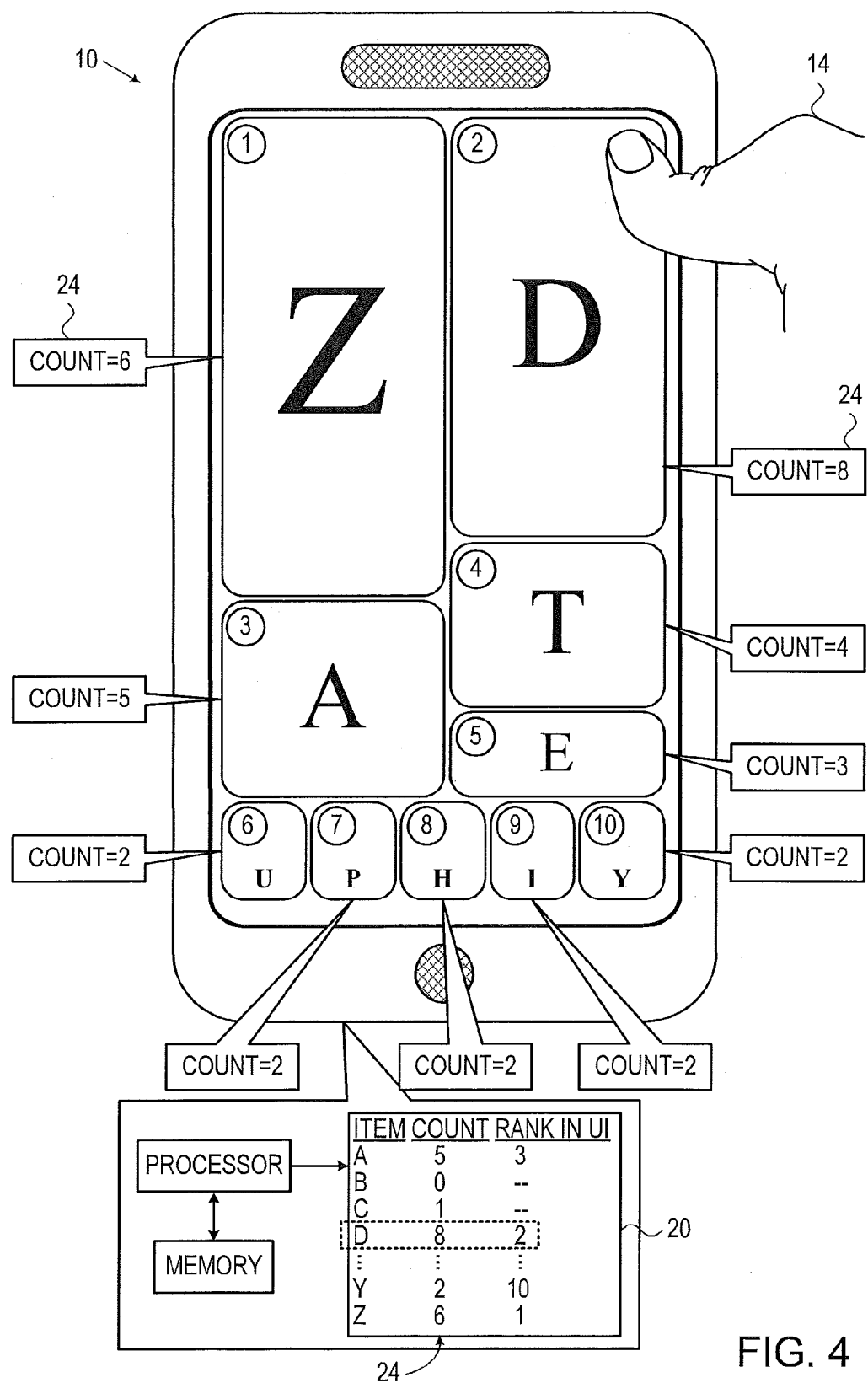
FIG. 4 is a partly pictorial, partly block diagram view of the treemap-type user interface system of FIG. 1 showing the user invoking the item a fourth time.

Reference is now made to FIG. 4. The count 24 of item D in the table 20 has been updated to 8 based on the user 14 invoking item D as shown in FIG. 3. FIG. 4 shows the user 14 invoking item D a fourth time.

Figure 5:
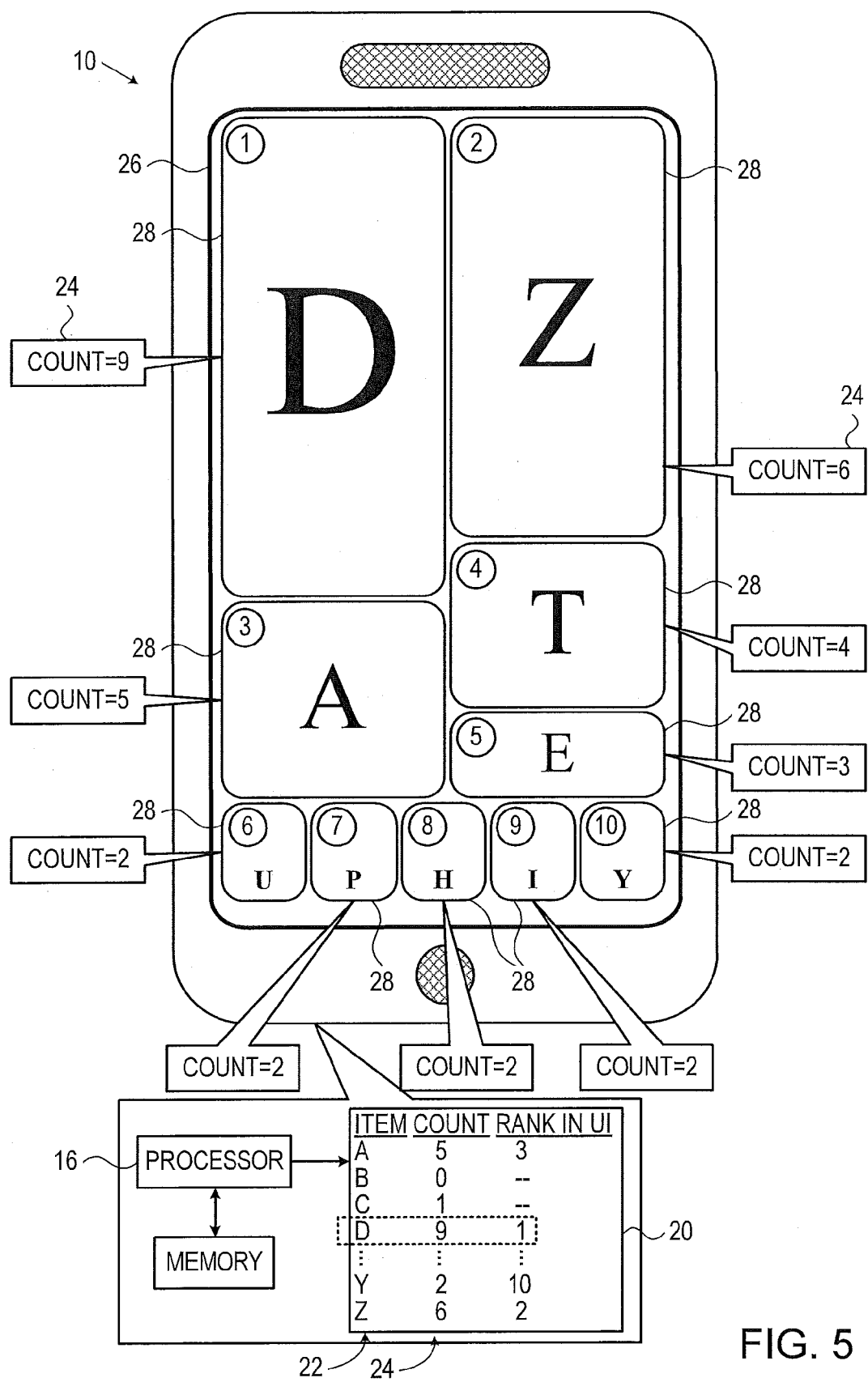
FIG. 5 is a partly pictorial, partly block diagram view of the treemap-type user interface system of FIG. 1 having refreshed the user interface.

Reference is now made to FIG. 5, which is a partly pictorial, partly block diagram view of the treemap-type user interface system 10 of FIG. 1 having refreshed the user interface 26.

The count 24 of item D in the table 20 has been updated to 9 based on the user 14 (FIG. 4) invoking item D as shown in FIG. 4. The count 24 of item D now exceeds (surpasses) the count 24 of item Z by 3, which is the value of the step used in the example of FIGS. 1-5.

The processor 16 is operative to refresh the assignment of the items 22 among the regions 28 of the user interface 26 when the count 24 of the selected item (item D in the example of FIG. 5) surpasses the count 24 of another one of the items (item Z in the example of FIG. 5) in the user interface 26 by a certain value (the step of 3 in the example of FIGS. 1-5), so that even though the assignment of the items 22 among the regions 28 is changed as a result of the refreshment, the arrangement and size of the regions 28 in the user interface 28 remains unchanged.

Each time one of the items 22 is selected, the processor 16 is operative to compare the count 24 of the selected item 22 with one or more of the items 22 in the user interface 26 as will be described in more detail with reference to FIGS. 9 and 11.

Methods for refreshing the user interface 26 are described in more detail with reference to FIGS. 9-11.

Figure 6:
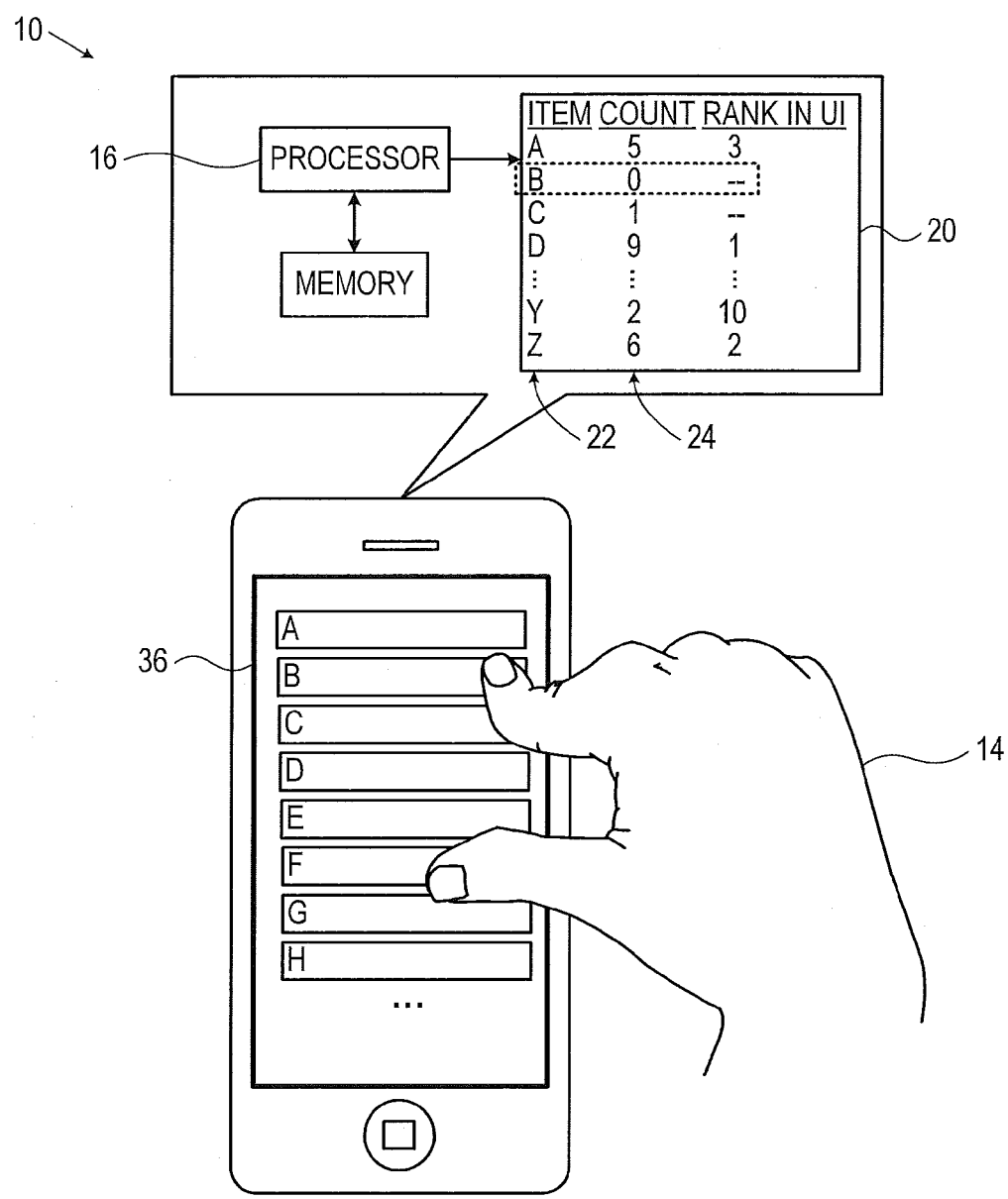
FIG. 6 is a partly pictorial, partly block diagram view of the treemap-type user interface system of FIG. 1 showing the user invoking an item which is not included in the treemap-type interface display.

Reference is now made to FIG. 6, which is a partly pictorial, partly block diagram view of the treemap-type user interface system 10 of FIG. 1 showing the user 14 invoking an item B which is not included in the treemap-type user interface 26 (FIGS. 1-5).

Items 22 which are not included in the user interface 26 (and optionally items 22 which are already in the user interface 26) may be accessed via some other suitable interface 36.

Prior to the user 14 invoking item B, the count 24 of item B in the table 20 was equal to zero.

Item B is then invoked 5 times by the user 14.

Each time item B is invoked by the user 14, the processor 16 is operative to increase the count 24 of item B in the table 20 and check to see if the count 24 of item B is high enough to warrant a refresh of the arrangement of the items 22 among the regions 28 (FIG. 5) in the user interface 26 (FIG. 5). Methods to check if the count of item B is large enough are described in more detail with reference to FIGS. 9 and 11.

Figure 7:
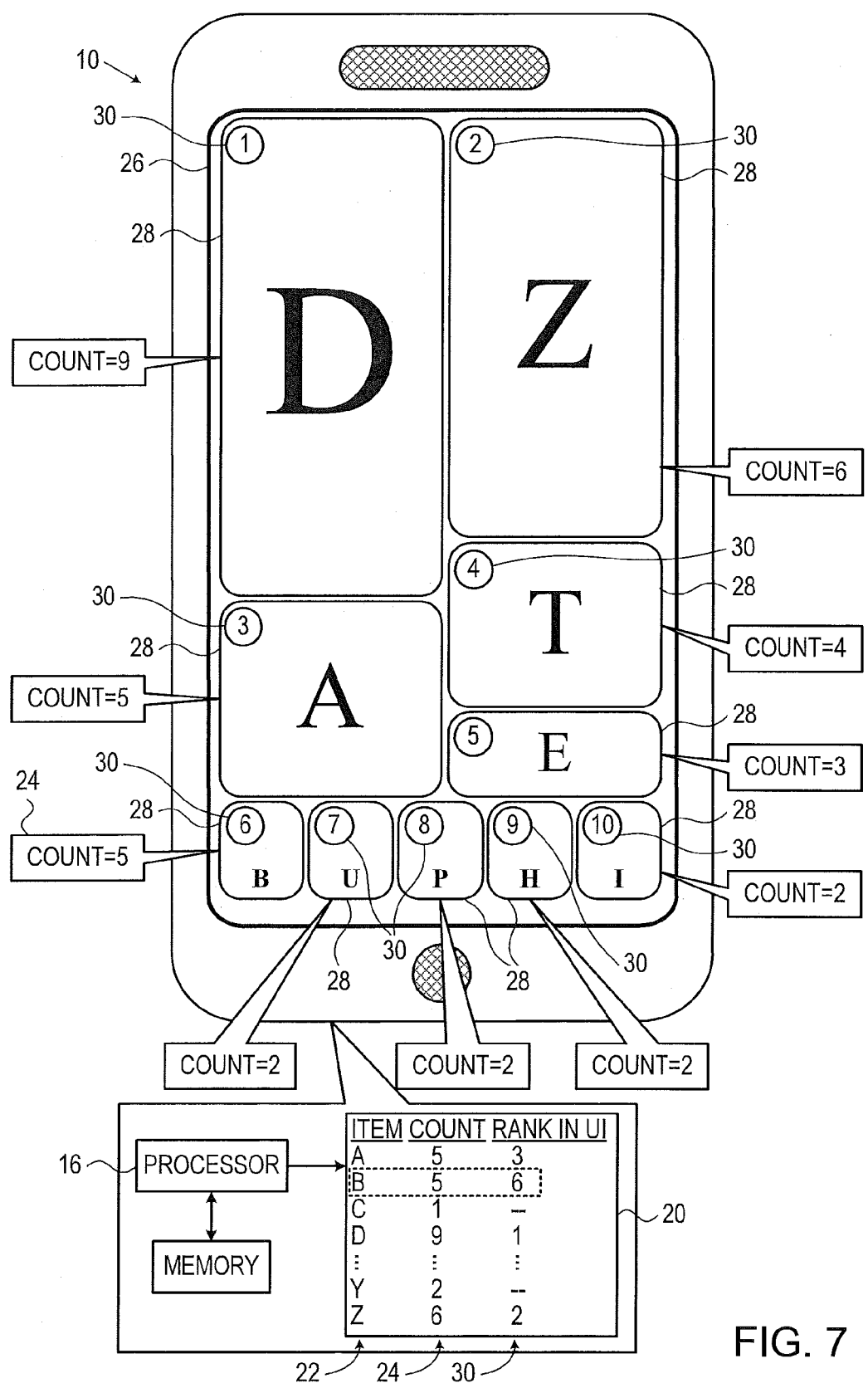
FIG. 7 is partly pictorial, partly block diagram view of the treemap-type user interface system after the user has invoked the item of FIG. 6 five times according to a first interface refresh method.

Reference is now made to FIG. 7, which is partly pictorial, partly block diagram view of the treemap-type user interface system 10 after the user 14 (FIG. 6) has already invoked item B five times (as described with reference to FIG. 6) according to a first interface refresh method.

The count 24 of item B in the table 20 now equals 5 which is greater than the count 24 of many of the items 22 in the user interface 26. The processor 16 is operative to refresh the assignment of the items 22 to the regions 28 in the user interface 26 taking the step value into account. Item B now has a rank (reference numeral 30) of 6. The ranks (reference numeral 30) of several of the items 22 have been changed and one item (item Y of FIGS. 1-6) has now been removed from the user interface 26. Refreshing the user interface 26 is described in more detail with reference to FIGS. 9-11.

Figure 8:
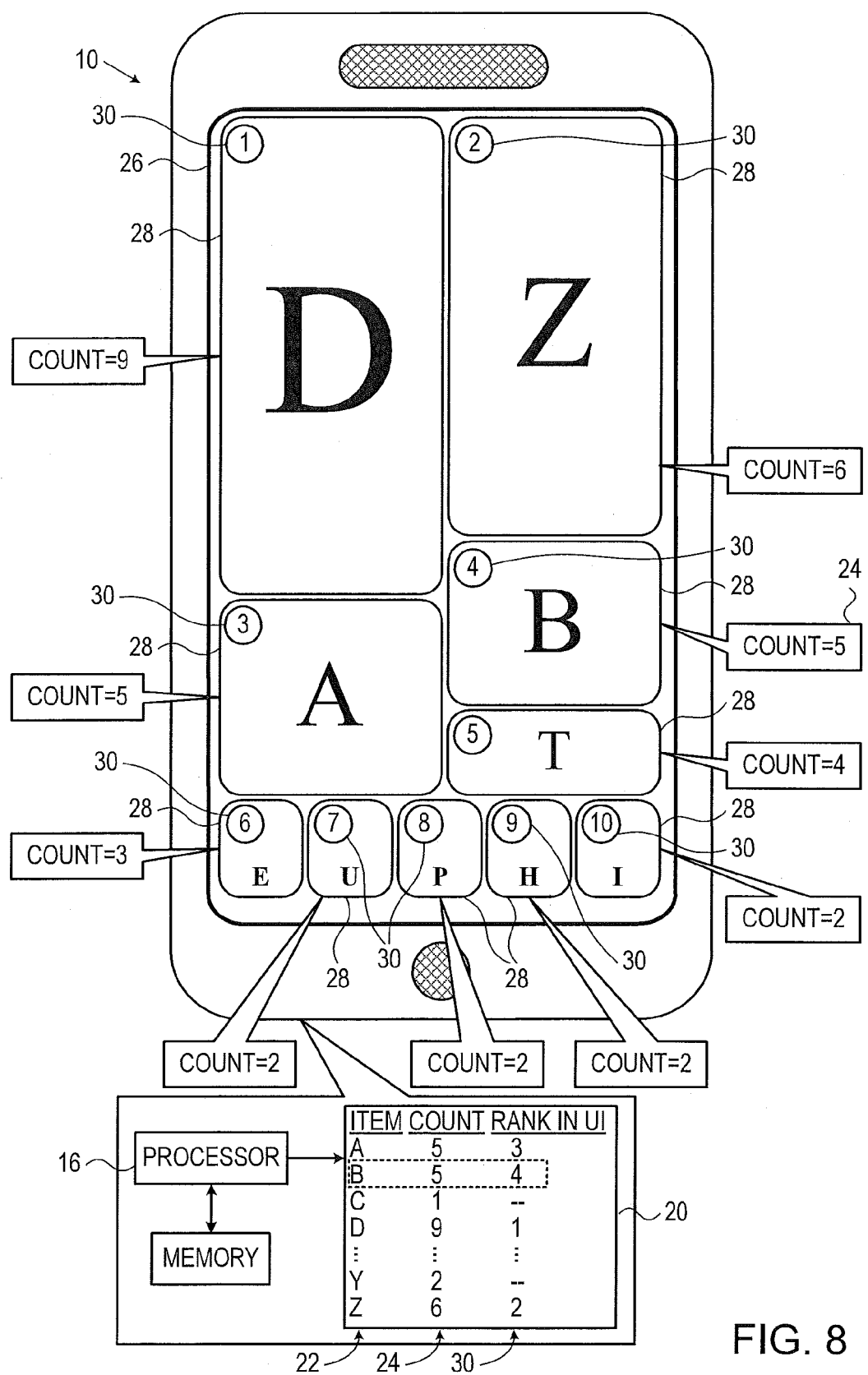
FIG. 8 is partly pictorial, partly block diagram view of the treemap-type user interface system after the user has invoked the item of FIG. 6 five times according to a second interface refresh method.

Reference is now made to FIG. 8, which is partly pictorial, partly block diagram view of the treemap-type user interface system 10 after the user 14 (FIG. 6) has already invoked item B five times (as described with reference to FIG. 6) according to a second interface refresh method.

According to a different interface refresh method, the processor 16 is operative to refresh the assignment of the items 22 among the regions 28 in the user interface 26 according to the count 24 of the items 22 so as the rank (reference numeral 30) of the assigned items 22 increases, the count 24 of the items 22 increases. Item B now has a rank (reference numeral 30) of 4. The ranks (reference numeral 30) of several of the items 22 have been changed and one item (item Y of FIGS. 1-6) has now been removed from the user interface 26. Refreshing the user interface 26 is described in more detail with reference to FIGS. 9-11.

In the description with reference to FIGS. 7 and 8 the lowest ranking item 22 (item Y of FIGS. 1-6) was removed from the user interface 26. However, it will be appreciated that any of the other lower ranking items 22 (with the same count as item Y or close to the same count) could be removed from the user interface 26 instead of the lowest ranking item. For example, the item 22 which has not been used for the longest time could be removed from the user interface 26 instead of removing the lowest ranking item 22.

Figure 9:
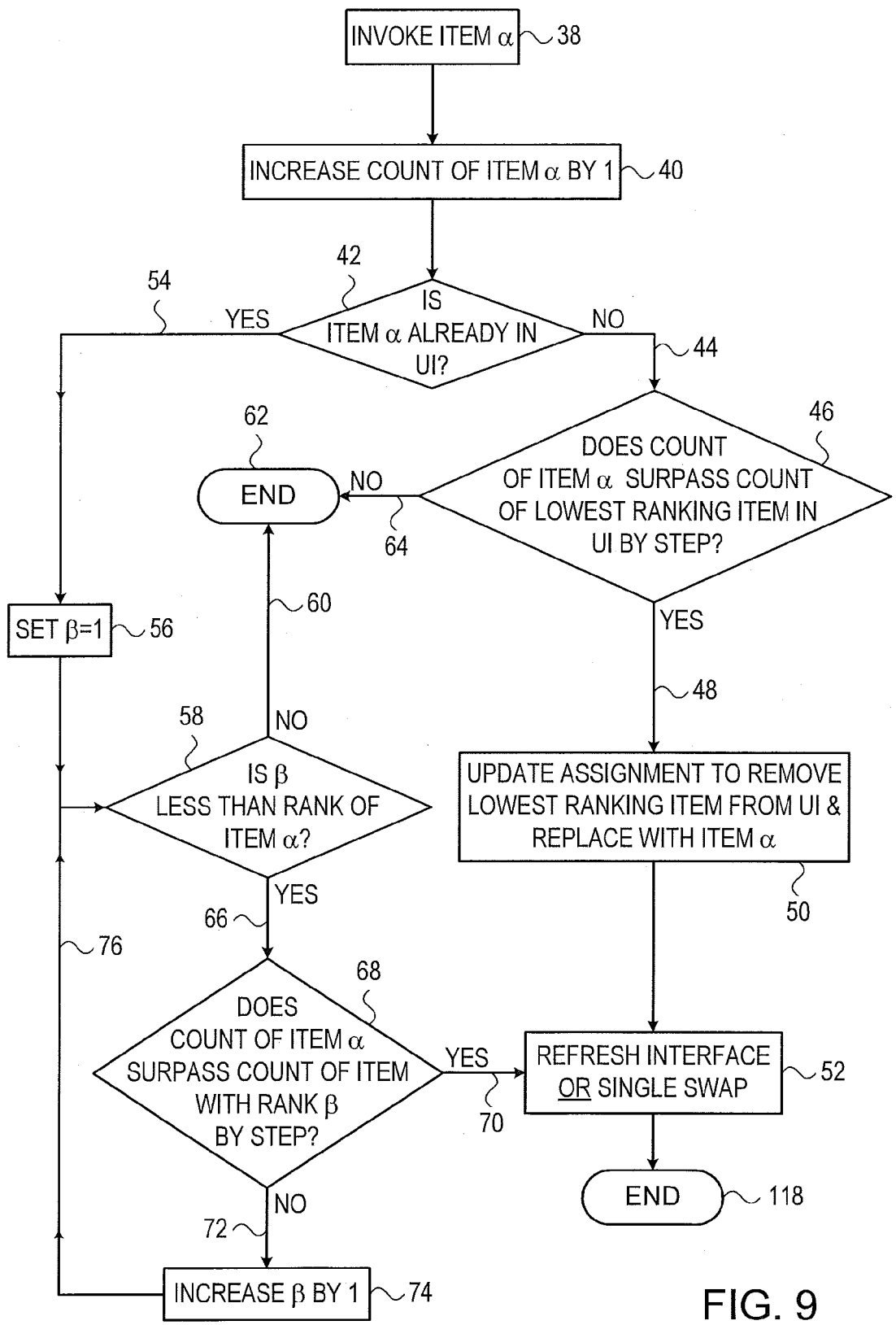
FIG. 9 is a flow chart of a method for deciding whether to refresh the interface in the system of FIG. 1.

Reference is now made to FIG. 9, which is a flow chart of a method for deciding whether to refresh the user interface 26 (FIG. 1) in the system 10 of FIG. 1.

Each time one of the items 22 (FIG. 1) is invoked/selected by the user 14 (block 38), the processor 16 (FIG. 1) is operative to perform the following steps. For the sake of convenience the selected one of the items 22 (FIG. 1) will be referred to as item α with reference to FIGS. 9-11.

The processor 16 (FIG. 1) increases the count of item α by 1 (block 40).

The processor 16 (FIG. 1) checks if item α (FIG. 1) is already included in the user interface 26 (FIG. 1) (decision point 42).

If item α is not already included in the user interface 26 (FIG. 1) (branch 44), the processor 16 (FIG. 1) evaluates whether the count of item α surpasses, by the step, the count of the item 22 (FIG. 1) having the lowest rank in the user interface 26 (decision point 46). If the evaluation yields a positive result (branch 48), the processor 16 (FIG. 1): (a) removes the assignment of the item 22 having the lowest rank from the user interface 26 and then assigns item α to the user interface 26 (FIG. 1) in place of the item having the lowest rank (block 50); and (b) refreshes the assignment of the items 22 (block 52). Refreshing the assignment of the items 22 is described in more detail below and with reference to FIG. 10. If the evaluation (block 46) does not yield a positive result (branch 64), the decision as to whether or not to refresh the user interface 26 is aborted (block 62).

If item α is already included in the user interface 26 (FIG. 1) (branch 54), the processor 16 (FIG. 1) checks if the count of item α surpasses, by the step, the count of item(s) 22 (FIG. 1) having a higher rank than the rank of item α in the user interface 26. The checking is started from the item 22 having the highest rank (rank 1) working down towards the rank of item α (but not including the rank of item α. The checking is stopped when the check yields a positive result or all the higher ranking items 22 have been checked. If the check yields a positive result, the processor 16 refreshes the assignment of the items 22. The above check has been broken down into steps in the flow chart of FIG. 9 as follows. The processor is operative to:

(a) set a variable β equal to 1 (block 56);

(b) check if β is less than the rank of item α (decision point 58);

(c) if β is not less than the rank of item α (branch 60) then the check is aborted (block 62);

(d) if β is less than the rank of item α (branch 66) then check if the count of item α surpasses, by the step, the count of an item with rank β (decision point 68);

(e) if the count of item α surpasses, by the step, the count of the item with rank β (branch 70) then refresh the assignment of the items 22 (block 52) and then the process is completed (block 118); and (f) if the count of item α does not surpass, by the step, the count of the item with rank β (branch 72), β is incremented by 1 (block 74) and the flow of the process is redirected back to decision point 58 (line 76).

Simply comparing the count of item α with the count of the next highest ranking item 22 (the item 22 with the rank of item α plus 1) instead of performing the loop logic performed above is possible but may not provide a thorough comparison in many cases as will be shown in the following example of 5 items in the user interface 26:

Let us say that at time 1, the count of the items from the highest rank to the lowest rank is given by:

| Rank | 1 | 2 | 3 | 4 | 5 |
|---|---|---|---|---|---|
| Item | AA | BB | CC | DD | EE |
| Count | 4 | 4 | 4 | 4 | 4 |

If the item with rank 3 is invoked, the count of the items will become:

| Rank | 1 | 2 | 3 | 4 | 5 |
|---|---|---|---|---|---|
| Item | AA | BB | CC | DD | EE |
| Count | 4 | 4 | 5 | 4 | 4 |

If the item with rank 4 is invoked three times, the count of the items will become:

| Rank | 1 | 2 | 3 | 4 | 5 |
|---|---|---|---|---|---|
| Item | AA | BB | CC | DD | EE |
| Count | 4 | 4 | 5 | 7 | 4 |

The count of the item with rank 4 only surpasses the item with rank 3 by 2 which is less than the step value of 3. However, the count of the item with rank 4 surpasses the item with rank 1 and the item with rank 2 by 3 (the step value). Therefore, in order to avoid such a situation from occurring, the loop logic is typically used.

Applying the loop logic to the above example, after the user interface 26 is refreshed the count of the items becomes:

| Rank | 1 | 2 | 3 | 4 | 5 |
|---|---|---|---|---|---|
| Item | DD | CC | AA | BB | EE |
| Count | 7 | 5 | 4 | 4 | 4 | or

| Rank | 1 | 2 | 3 | 4 | 5 |
|---|---|---|---|---|---|
| Item | DD | BB | CC | AA | EE |
| Count | 7 | 4 | 5 | 4 | 4 | depending whether the step is taken into account in the interface refresh method as will be described below in more detail.

Refreshing the interface is described in more detail with reference to FIG. 10.

Instead of performing the method described with reference to FIG. 10, when item α was already in the user interface 26 (FIG. 1), the positions of item α and the positions of the item with rank β may be swapped in the user interface 26 in order to refresh the user interface 26 (block 52). So if item α is assigned to region x and the item with rank β is assigned to region y prior to refreshing the assignment of the items 22 among the regions 28, when the count of item α surpasses the count of the item with rank β in the user interface by the step, the processor 16 (FIG. 1) is operative to swap the assignment of item α and the item with rank β in the user interface 26 so that item α is re-assigned to region y and the item with rank β is re-assigned to the region x.

Figure 10:
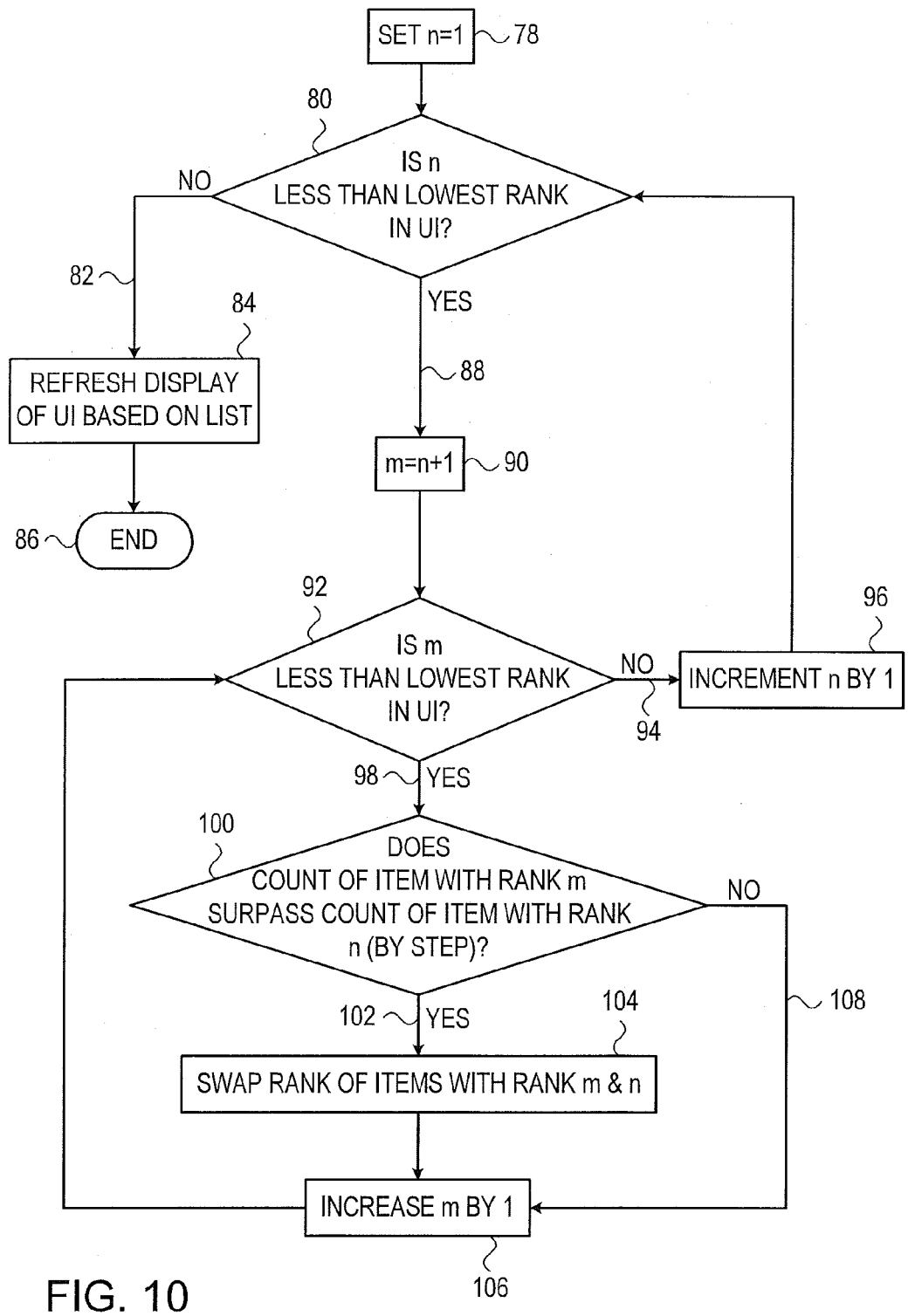
FIG. 10 is a flow chart of a method for refreshing the interface in the system of FIG. 1.

Reference is now made to FIG. 10, which is a flow chart of a method for refreshing the user interface 26 (FIG. 1) in the system 10 of FIG. 1.

Refreshing the user interface 26 (FIG. 1) is now described in more detail.

When the count of item α surpasses, by the step, the count of the item with rank β or the item with the lowest rank in the user interface 26 (FIG. 1) (if item α was not already in the user interface 26), the processor 16 is operative to refresh the assignment of the items 22 (FIG. 1) among the regions 28 (FIG. 1) of the user interface 26 according to the count 24 (FIG. 1) of the items 22 (FIG. 1) with respect to the rank (reference numeral 30) (FIG. 1) of the regions 28 so that as the count 24 of the items 22 increases, the rank (reference numeral 30) of the regions 28 increases. A way to perform the refresh is to compare each of the items in the user interface 26 (FIG. 1) with each other and swap the assignment of the compared items if a lower ranking item 22 exceeds a higher ranking item 22.

An alternate refresh method is for the processor 16 (FIG. 1) to compare each of the items in the user interface 26 (FIG. 1) with each other and swap the assignment of the compared items if a lower ranking item 22 exceeds a higher ranking item 22 by the step.

Both of the above refresh methods are now described in more detail with reference to FIG. 10.

The processor 16 (FIG. 1) is operative to:
(a) set a variable n to equal 1 (block 78);
(b) check if n is less than the rank of the region 28 (FIG. 1) with the lowest rank (rank 10 in the example of FIG. 1) in the user interface 26 (FIG. 1) (decision point 80);
(c) if n is not less than the lowest rank in the user interface 26 (branch 82) then refresh the display of the user interface 26 based on the table 20 (FIG. 1) (block 84) thereby ending the refresh process (block 86);
(d) if n is not less than the lowest rank in the user interface 26 (branch 88) then:
 (i) set a variable m to be equal to n plus 1 (block 90); and
 (ii) check if m is less than the lowest rank in the user interface 26 (decision point 92);
(e) if m is not less than the lowest rank in the user interface 26 (branch 94), increment n by 1 (block 96) and continue with the step at decision point 80;
(f) if m is less than the lowest rank in the user interface 26 (branch 98), then check if the count of the item with rank m surpasses the count of the item with rank n by the step (decision point 100);
(g) if the check in step (f) yields a positive result (branch 102) swap the rank of item m with the rank of item n (block 104) and increase the value of m by 1 (block 106) and then continue with decision point 92; and
(h) if the check in step (f) does not yield a positive result (branch 108) then the process continues with block 106 and then with decision point 92.

Step (f) may alternatively be replaced by: if m is less than the lowest rank in the user interface 26 (branch 98), then check if the count of the item with rank m surpasses the count of the item with rank n (decision point 100).

Figure 11:
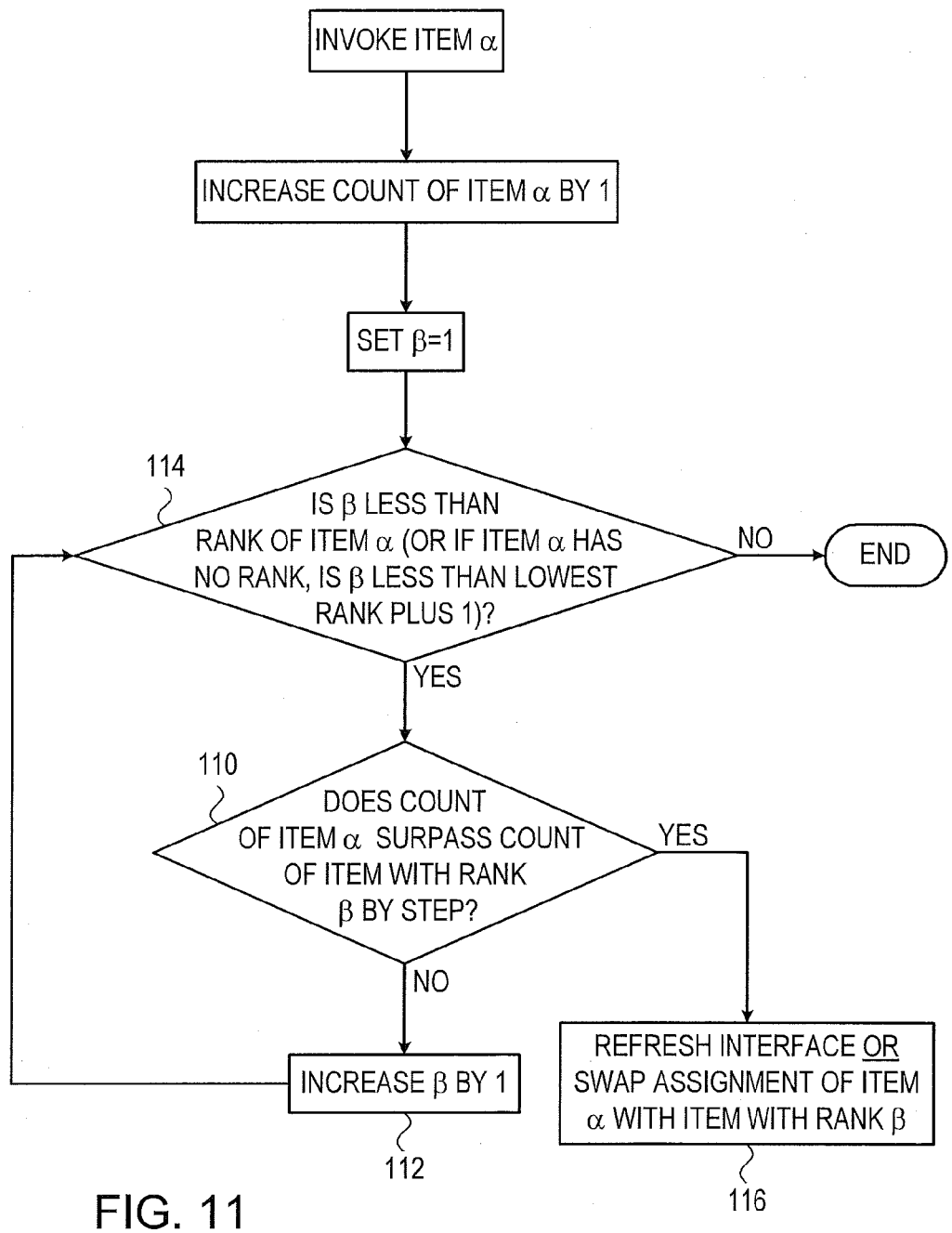
FIG. 11 is a flowchart of another method for deciding whether to refresh the interface in the system of FIG. 1.

Reference is now made to FIG. 11, which is a flowchart of another method for deciding whether to refresh the user interface 26 (FIG. 1) in the system 10 of FIG. 1.

The method described with reference to FIG. 11 is substantially the same as the method described with reference to FIG. 9 except for the following differences. In FIG. 11, the count of the selected item 22 (FIG. 1), whether the selected item 22 is already in the user interface 26 (FIG. 1) or not, is compared to items 22 having a higher rank than the rank of the selected item 22. The comparison is performed starting from the item 22 having the highest rank and working down towards the rank of the selected item (exclusive of the rank of the selected item) if the selected item has a rank, or to the lowest rank (inclusive of the lowest rank) in the user interface 26 if the selected item does not have a rank. The check is stopped when the check yields a positive result or if all the higher ranking items have been checked without a positive result.

In FIG. 11, at a decision point 110, the processor 16 (FIG. 1) compares the count of item α and the count of the item 22 (FIG. 1) with rank β. At block 112 and at decision point 114 the loop through the different values β is managed.

If the check yields a positive result, the processor is operative to refresh the assignment of the items 22 among the regions 28 of the user interface 26 as described above with reference to FIG. 10 (block 116).

Alternatively, if the check yields a positive result, the processor 16 is operative to refresh the user interface 26 by swapping the assignment of item α and the item with rank β in the user interface 26 as described with reference to FIG. 9 (block 116). If item α was not previously in the user interface 26, item α will be included in the user interface 26 in the place of the item with rank β and the item with rank β will be removed from the user interface 26.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A user interface system based on a treemap-type presentation, the system comprising a processor; and a memory to store data used by the processor, wherein the processor is operative to:
store data for a plurality of items which can be invoked;
generate data for a user interface screen having a plurality of regions arranged according to an arrangement, at least some of the regions being different sizes and being arranged in the arrangement according to a size order of the at least some of the plurality of regions:
assign at least some of the items to the regions of the user interface screen;
receive a plurality of user selections from an input device;
determine which one of the items is being selected for each one of the user selections;
generate a count of how many times each of the items is invoked; and upon determining that the count of the selected one item exceeds the count of another one of the items by a value of at least two, refresh an assignment of the items among the regions of the user interface screen so the assignment of the items among the regions of the different sizes is changed as a result of the refreshment and the arrangement and sizes of the regions in the user interface screen remain unchanged, wherein the assignment of the items among the regions of the user interface screen is not refreshed upon determining that the count of the selected one item exceeds the count of another one of the items by one;

wherein: the selected one item is assigned to a first one of the regions prior to refreshing the assignment of the items among the regions;

the other item is assigned to a second one of the regions prior to refreshing the assignment of the items among the regions; and when the count of the selected one item surpasses the count of the other item in the user interface screen by the value, the processor is operative to swap the assignment of the selected one item and the other item in the user interface screen so that the selected one item is re-assigned to the second region and the other item is re-assigned to the first region.

2. The system according to claim 1, wherein the arrangement of the regions is a treemap-type arrangement, the regions being substantially rectangular regions.

3. The system according to claim 1, wherein for each one of the user selections, the processor is operative to:

determine which one of the regions of the user interface screen is being selected by the one user selection; and determine which one of the at least some items is being selected by the one user selection based on which one of the at least some items has been assigned to the selected one region.

4. The system according to claim 1, wherein the input device is selected from one of the following: a touch sensitive screen, a pointing device and a voice activated interface.

5. The system according to claim 1, wherein the plurality of items which can be invoked are selected from one of the following: contacts from an address book, software applications, items in an electronic program guide, floors selectable from an elevator control panel and Internet sites.

6. The system according to claim 1, wherein the processor is operative to determine a minimum size of the regions based on an operational environment of the: user interface screen.

7. The system according to claim 6, wherein the processor is operative to determine the quantity of the regions in the user interface screen based on an operational environment of the user interface screen.

8. The system according to claim 1, wherein the processor is operative to:

rank the regions based on the size of the regions with a largest one of the regions having the highest rank; and when the count of the selected one item surpasses the count of the other item in the user interface screen by the certain value, refresh the assignment of the items among the regions of the user interface screen according to the count of the items with respect to the rank of the regions so that as the count of the items increases, the rank of the regions increases.

9. The system according to claim 1, wherein the processor is operative to:

rank the regions based on the size of the regions with a largest one of the regions having the highest rank;

rank each one of the items in the user interface screen according to the rank of one of the regions to which the one item is assigned; and check if the count of the selected one item surpasses, by the certain value, the count of at least one of the items having a higher rank than the rank of the selected one item in the User interface screen, starting the check from the at least one item having the highest rank and working down towards the rank of the selected one item and stopping the check when the check yields a positive result.

10. The system according to claim 9, wherein when the check yields the positive result, the processer is operative to refresh the assignment of the items among the regions of the user interface screen according to the count of the items with respect to the rank of the regions so that as the count of the items increases, the rank of the regions increases.

11. The system according to claim 9, wherein:

the at least one item that yields a positive result in the check is the other item;

the selected one item is assigned to a first one of the regions prior to refreshing the assignment of the items among the regions;

the other item is assigned to a second one of the regions prior to refreshing the assignment of the items among the regions; and when the check yields the positive result, the processor is operative to swap the assignment of the selected one item and the other item in the user interface screen so that the selected one item is assigned to the second region and the other item is assigned to the first region.

12. The system according to claim 1, wherein the processor is operative to:

rank the regions based on the size of the regions with a largest one of the regions having the highest rank;

rank each one of the items in the user interface screen according to the rank of one of the regions to Which the one item is assigned;

check if the selected one item 'is already included in the user interface screen; and if the selected one item is not already included in the user interface screen:

evaluate whether the count of the selected one item surpasses, by the value, the count of one of the items having a lowest rank in the user interface screen; and if the evaluation yields a positive result: (a) remove the assignment of the one item having the lowest rank from the user interface screen and then assign the selected one item to the user interface screen in place of the one item having the lowest rank: and (b) refresh the assignment of the items.

13. The system according to claim 12, wherein the processor is operative to refresh the assignment of the items to the regions in the user interface screen according to the count of the items with respect to the rank of the regions so that as the count of the items increases, the rank of the regions increases.

14. The system according to claim 12, wherein the refresh of the assignment of the items includes comparing each of the items in the user interface screen with each other and swapping the assignment of the compared items if a lower ranking one of the items exceeds a higher ranking one of the items by the value.

15. The system according to claim 12, wherein the processor is operative to:

if the selected one item is already included in the user interface screen, check if the count of the selected one, item surpasses, by the value, the count of at least one of the items having a higher rank than the rank of the selected one item in the user interface screen, starting the check from the at least one item having the highest rank and working down towards the rank of the selected one item and stopping the check when the check yields a positive result; and if the check yields the positive result, refresh the assignment of the items.

16. The system according to claim 12, wherein the processor is operative to refresh the assignment of the items to the regions in the user interface screen according to the count of the items with respect to the rank of the regions so that as the count of the items increases, the rank of the regions increases.

17. The system according to claim 12, wherein the refresh of the assignment of the items includes comparing each of the items in the user interface screen with each other and swapping the assignment of the compared items if a lower ranking one of the items exceeds a higher ranking one of the items by the certain value.

18. A user interface method based on a treemap-type presentation, the method comprising performing the following with a processor:

storing data for a plurality of items which can be invoked;

generating data for a user interface screen having a plurality of regions arranged according to an arrangement, at least some of the regions being different sizes and being arranged in the arrangement according to size order of the at least some of the plurality of regions;

assigning at least some of the items to the regions of the user interface screen;

receiving a plurality of user selections from an input device;

determining which one of the items is being selected for each one of the user selections;

generating a count of how many times each of the items is invoked; and upon determining that the count of the selected one item exceeds the count of another one of the items by a value of at least two, refreshing an assignment of the items among the regions of the user interface screen so the assignment of the items among the regions of the different sizes is changed as a result of the refreshment and the arrangement and sizes of the regions in the user interface screen remain unchanged wherein the assignment of the items among the regions of the user interface screen is not refreshed upon determining that the count of the selected one item exceeds the count of another one of the items by one;

wherein: the selected one item is assigned to a first one of the regions prior to refreshing the assignment of the items among the regions;

the other item is assigned to a second one of the regions prior to refreshing the assignment of the items among the regions; and when the count of the selected one item surpasses the count of the other item in the user interface screen by the value, the processor is operative to swap the assignment of the selected one item and the other item in the user interface screen so that the selected one item is re-assigned to the second region and the other tern is re-assigned to the first region.

* * * * *